Aug. 8, 1933.  A. M. HERBSMAN  1,921,751
METHOD OF TREATING PETROLEUM EMULSIONS
Filed June 17, 1931
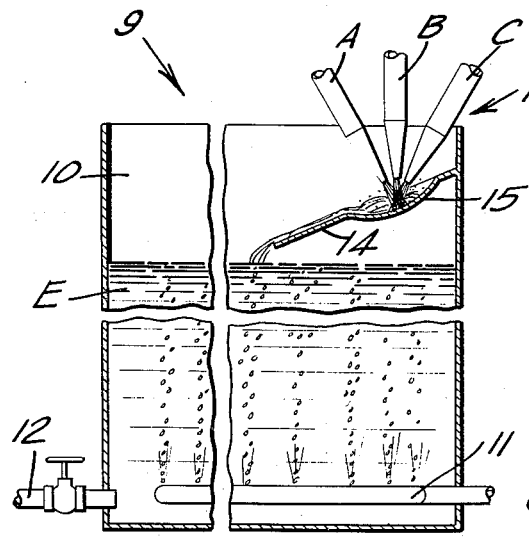
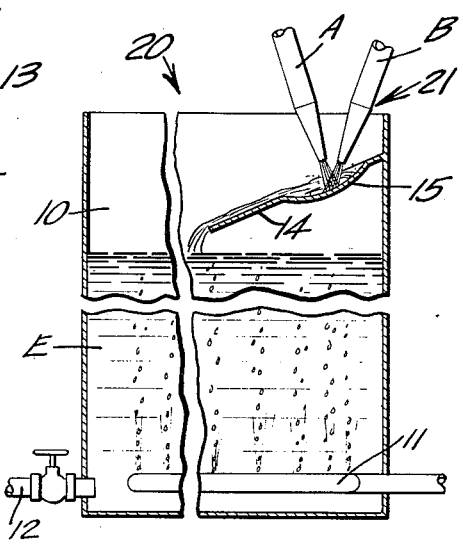
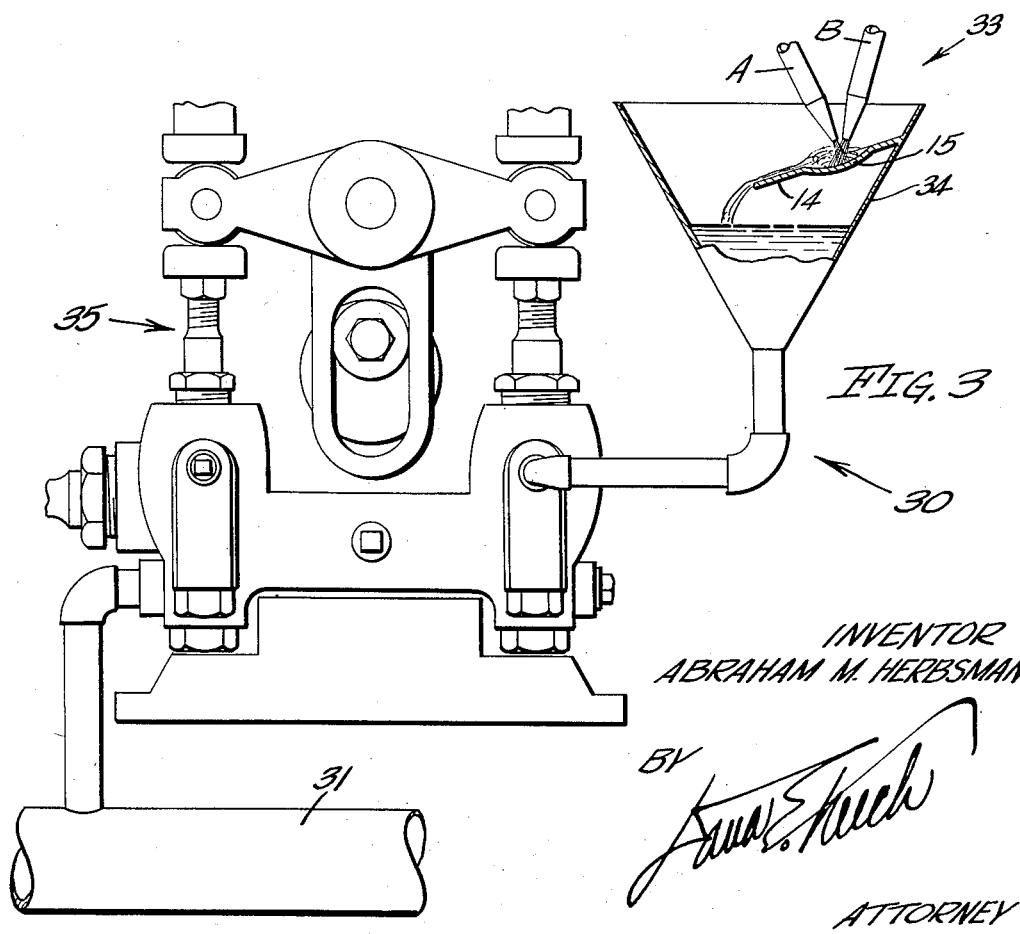
INVENTOR
ABRAHAM M. HERBSMAN
BY
ATTORNEY Patented Aug. 8, 1933

1,921,751

UNITED STATES PATENT OFFICE 1,921,751

METHOD OF TREATING PETROLEUM EMULSIONS

Abraham M. Herbsman, Huntington Park, Calif.

Application June 17, 1931. Serial No. 545,153

11 Claims. (Cl. 196—4)

My invention relates to the treatment of petroleum emulsions and has for its principal object the provision of a novel method of agglomerating the dispersed water phase in these emulsions so that the oil in the emulsion may be separated from the water and become commercially useful.

It is also an object of my invention to provide a method of chemically treating petroleum emulsions to remove the water therefrom which is relatively inexpensive.

It is a still further object of my invention to provide a method of treating petroleum emulsions the effectiveness of which will not be decreased by hardness of the water in the emulsion.

The process of my invention involves the treatment of a body of petroleum emulsion with an insoluble soap and I have found that this process is much more effective where the soap has been freshly formed just prior to its use.

In carrying out the method of this invention I have found that petroleum emulsions can be broken by introducing into these metallic fatty soaps, such as stearates and oleates of aluminum, calcium or magnesium with or without metallic fatty sulphonates that are incapable of softening water.

The preferred manner of carrying out this method is to mix water soluble fatty compounds or soaps with water containing an excess of lime or magnesium salts, such as the chlorides or bicarbonates or calcium or magnesium so as to precipitate the water soluble fatty soaps and compounds entirely in the form of the corresponding metallic fatty compounds, and then introducing the suspension thus formed into the emulsion to be treated. It is of course to be noted that the precipitants are not limited to calcium or magnesium salts. Any water soluble salt that will react with a water soluble soap to form an insoluble metallic soap will serve the same purpose.

The method as thus set forth may be carried out by having a jet of water soluble fatty compounds or soaps impinge on a baffle plate simultaneously with a jet of an aqueous solution of a salt of calcium or magnesium or other aqueous precipitant in the form of a spray or mist, and then permitting soaps precipitated from this mixture and contained in the resulting liquid in suspension, to mix with the emulsion.

Another type of the method of my invention consists in the formation of insoluble soaps and the admixture of these with mineral oil after which the resulting suspension is mixed with the emulsion to be treated. This type of the method of my invention may be carried into effect by three jets impinging simultaneously on a baffle plate, these jets respectively directing streams or sprays of water soluble fatty compounds, an alkaline earth compound, and a mineral oil so that formation of insoluble soaps in suspension in oil and water is produced. The suspension thus formed is preferably to be produced just prior to the treatment of emulsion and it is fed into the emulsion as the suspension is formed.

In the accompanying drawing,

Fig. 1 illustrates diagrammatically a preferred form of apparatus for carrying out the method of my invention in treating an emulsion in a tank.

Fig. 2 illustrates diagrammatically a modified form of the apparatus shown in Fig. 1.

Fig. 3 illustrates a preferred form of apparatus for carrying out the method of my invention in treating an emulsion in a pipe line.

Referring specifically to the drawing, an emulsion treating apparatus 9 is shown in Fig. 1, this apparatus including a tank 10 having a gas agitating manifold 11 and a valve drain pipe 12. Supported in any suitable manner in the upper end of the tank 10 is a suspension forming apparatus 13 which includes a pan 14 having a shallow bowl 15 provided therein and three nozzles A, B, and C positioned over the bowl 15 so that the axes of these nozzles intersect in this bowl.

In using the apparatus 9 to carry out the method of my invention, the valve in the pipe 12 is closed and a quantity of emulsion E is delivered into the tank 10. Air or gas under high pressure is now forced through the manifold 11 so as to be emitted therefrom in sufficient quantity to set up a very active turbulence in the emulsion E. The nozzle A is connected to a reservoir (not shown) containing an aqueous solution of a water soluble fatty compound under pressure. The nozzle B is connected to a reservoir containing a quantity of a solution of an alkaline earth compound or any other preferred aqueous precipitant under pressure. The nozzle C is connected to a reservoir containing a quantity of mineral oil under pressure. Suitable valves (not shown) connecting the nozzles A, B, and C to their respective reservoirs are now opened so that jets of the liquids contained in said reservoirs are emitted from these nozzles and impinge upon the baffle plate 14 within the cup 15.

The mixing of these jets as they strike the baffle plate 14 is almost instantaneous and this results in the precipitation of a water insoluble soap in the form of a finely divided suspension. As soon as this suspension is formed it runs down off the baffle 14 into the emulsion E and is rapidly disseminated throughout this emulsion by the agitation thereof effected through the discharge of gas from the manifold 11.

After the proper amount of treating liquid has been formed and discharged into the emulsion E by the apparatus 13 the valves of the nozzles A, B, and C are turned off, the supply of gas through the manifold 11 is also turned off, and the emulsion E is allowed to stand for a sufficient period to effect the stratification of the oil and the water released by the treatment. After this stratification has taken place, first the water and then the oil is decanted through the pipe 12.

In Fig. 2, I have shown an emulsion treating apparatus 20 which is practically a duplicate of the emulsion treating apparatus 9 shown in Fig. 1 excepting that the nozzle C is omitted so that the emulsion treating liquid produced in the apparatus 20 by the suspension forming apparatus 21 thereof is not admixed with mineral oil, as in the apparatus 9. In the apparatus 20, the treating agent is formed as a water solution carrying the soap suspension, but this is immediately discharged into the emulsion E and becomes mixed with mineral oil in the emulsion.

The treatment of emulsion in the apparatus 20 is accomplished in exactly the same manner as already described for the apparatus 9, an important feature of my invention thus carried out being the delivery of the suspension into the emulsion and the thorough mixing of the suspension with the emulsion almost immediately after the suspension has been formed.

In Fig. 3 I have shown diagrammatically an emulsion treating apparatus 30 which is adapted to prepare the treating agent and inject this into an emulsion pipe line 31 as the treating agent is prepared. The apparatus 30 includes a treating agent preparing apparatus 33 which is substantially identical with the apparatus 21 and which is supported in a funnel 34. A high pressure compound pump 35 is connected to the funnel 34 and to the pipe line 31 and is adapted to receive emulsion treating agent formed by the apparatus 33 and forces this into the pipe line where it is thoroughly mixed with the emulsion flowing in this pipe line by the turbulence of the emulsion therein. The pump 35 may be any well known pump adapted for the purpose of feeding emulsion in the pipe line, but it is preferred to use the type of compound pump shown in the copending application of Abraham M. Herbsman and Rodney B. Campbell, Serial No. 522,378, filed March 13, 1931, the pump 35 being a fragmentary diagrammatic representation of that pump.

The treatment of the emulsion by my method causes a coagulation of the water phase in the emulsion and the separation of the oil and water in the emulsion is preferably effected in the usual manner, of allowing the treated emulsion to stand until stratification takes place.

It is also to be understood that chemical treatment of an emulsion in the manner of my invention may also be used in connection with electrical dehydration in the same way as other methods of chemical treatment are used.

Among the different manners in which the insoluble soap used in my method for treatment of emulsions may be applied to the emulsion are: feeding the chemical directly into a tank filled with emulsion; injecting the treating chemical into a pipe line along which emulsion is flowing; injecting the treating chemical into a well from which petroleum is being produced; and feeding the treating chemical directly into emulsion passing through an electrical dehydrator.

While I have mentioned calcium and magnesium soaps as particularly useful in the method of my invention, yet it is to be understood that there are many other metallic soaps, such as iron oleate or aluminum stearate, which give as good or better coagulation of the emulsion than calcium or magnesium soaps.

In my copending application for U. S. Letters Patent Ser. No. 536,490, filed May 11, 1931 on a method of treating petroleum emulsions by compounds containing a chlorine radical, I have disclosed a method of treating emulsions with various chlorinated substances, such as chlorinated, sulphonated fatty oils. In the present invention oils of this kind may be used in the treatment of petroleum emulsion excepting that before their injection into the emulsion all water soluble soap or water softening compounds in the chlorinated oil would be precipitated by mixture therewith of water soluble metallic soaps. It may usually be expected that sulphonated oil of this type may contain a fatty acid, such as oleic acid, which has not been sulphonated and which is capable of forming a soap, either water soluble, such as sodium oleate, or water insoluble, such as calcium oleate. In the present method, use of such sulphonated oil in treating emulsion would be deferred until this oleic acid had been converted into an insoluble precipitate, after which the sulphonated oil containing this precipitate in suspension would be applied to the emulsion for the treatment thereof.

While I have described the method of my invention hereinabove as being carried out by the precipitation of insoluble soap and the introduction thereafter of this either in suspension in water or in suspension or solution in oil into the emulsion to be treated, I also desire it to be understood that the method of my invention includes the introduction of a water insoluble soap into the emulsion to be treated, either in the form of a dry powder or other solid form or in the form of an oil solution of same. The method of the invention may also be performed by the introduction of the chemical in solid form into oil to form an oil solution of the chemical, then mixing water with the solution to form an oil and water suspension of the chemical and thereafter introducing this suspension into the emulsion to be treated.

What I claim is:

1. A method for treating petroleum emulsions which consists in providing, in a liquid treating agent, a highly nascent colloidal suspension by precipitating a soap therein and mixing the treating agent with the emulsion as fast as said suspension is formed.

2. A method for treating petroleum emulsions which consists in providing, in a liquid treating agent, a highly nascent colloidal suspension by precipitating a water insoluble soap therein and mixing the treating agent with the emulsion as fast as said suspension is formed.

3. A method for treating petroleum emulsions which consists in providing, in a liquid treating agent, a highly nascent colloidal suspension by precipitating a water insoluble alkaline earth soap therein and mixing the treating agent with the emulsion as fast as said suspension is formed.

4. A method for treating petroleum emulsions which consists in providing a baffle member directing simultaneously upon the member jets of aqueous solutions of a water soluble fatty compound and an aqueous precipitant to form a suspension, and mixing the suspension with said emulsion as fast as said suspension is formed.

5. A method for treating petroleum emulsions which consists in providing a baffle member directing simultaneously upon the member jets of aqueous solutions of a water soluble fatty compound and an alkaline earth compound to form a suspension and mixing the suspension with said emulsion as fast as said suspension is formed.

6. A method for treating petroleum emulsions which consists in providing a baffle member, directing simultaneously upon the member jets of an aqueous solution of a water soluble fatty compound, an aqueous precipitant, and a mineral oil to form a suspension, and mixing the suspension with said emulsion as fast as said suspension is formed.

7. A method for treating petroleum emulsions which consists in providing a baffle member, directing simultaneously upon the member jets of aqueous solutions of a water soluble fatty compound, an alkaline earth compound, and a mineral oil to form a suspension, and mixing the suspension with said emulsion as fast as said suspension is formed.

8. A method for treating petroleum emulsions which consists in directing simultaneously upon a baffle member jets of aqueous solutions of a water soluble fatty compound and an aqueous precipitant to form a suspension, and mixing the suspension with said emulsion as fast as said suspension is formed.

9. A method for treating petroleum emulsions which consists in directing simultaneously upon a baffle member jets of aqueous solutions of a water soluble fatty compound and an alkaline earth compound to form a suspension, and mixing the suspension with said emulsion as fast as said suspension is formed.

10. A method for treating petroleum emulsions which consists in directing simultaneously upon a baffle member jets of an aqueous solution of a water soluble fatty compound, an aqueous precipitant, and a mineral oil to form a suspension, and mixing the suspension with said emulsion as fast as said suspension is formed.

11. A method for treating petroleum emulsions which consists in directing simultaneously upon a baffle member jets of aqueous solutions of a water soluble fatty compound, an alkaline earth compound, and a mineral oil to form a suspension, and mixing the suspension with said emulsion as fast as said suspension is formed.

ABRAHAM M. HERBSMAN.